(12) United States Patent
Hu et al.

(10) Patent No.: US 8,921,487 B2
(45) Date of Patent: Dec. 30, 2014

(54) OXYGEN SCAVENGING TERPOLYMERS

(75) Inventors: Ling Hu, Westlake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 243 days.

(21) Appl. No.: 13/378,885

(22) PCT Filed: Jun. 17, 2010

(86) PCT No.: PCT/US2010/038977
§ 371 (c)(1),
(2), (4) Date: Dec. 16, 2011

(87) PCT Pub. No.: WO2010/148188
PCT Pub. Date: Dec. 23, 2010

(65) Prior Publication Data
US 2012/0100263 A1    Apr. 26, 2012

Related U.S. Application Data

(60) Provisional application No. 61/218,637, filed on Jun. 19, 2009.

(51) Int. Cl.
| | |
|---|---|
| C08F 8/00 | (2006.01) |
| C08G 63/91 | (2006.01) |
| C08L 67/02 | (2006.01) |
| C09K 15/06 | (2006.01) |
| B29C 49/00 | (2006.01) |
| C08F 220/32 | (2006.01) |
| C08J 3/22 | (2006.01) |
| C08L 9/00 | (2006.01) |
| C08L 25/14 | (2006.01) |
| C08L 87/00 | (2006.01) |

(52) U.S. Cl.
CPC ............ *C09K 15/06* (2013.01); *B29C 49/0005* (2013.01); *C08F 220/32* (2013.01); *C08J 3/226* (2013.01); *C08L 67/02* (2013.01); *C08J 2367/02* (2013.01); *C08J 2467/00* (2013.01); *C08L 9/00* (2013.01); *C08L 25/14* (2013.01); *C08L 87/00* (2013.01)
USPC ............ 525/166; 525/165; 525/175; 525/176

(58) Field of Classification Search
USPC ........ 525/55, 165, 166, 175, 176; 524/80, 81, 524/413, 597, 612
See application file for complete search history.

(56) References Cited

U.S. PATENT DOCUMENTS

| | | | |
|---|---|---|---|
| 5,049,624 A | 9/1991 | Adams et al. | |
| 5,159,005 A | 10/1992 | Frandsen et al. | |
| 5,231,161 A | 7/1993 | Brunelle et al. | |
| 5,281,669 A * | 1/1994 | Kambour et al. | 525/177 |
| 5,346,644 A | 9/1994 | Speer et al. | |
| 5,350,622 A | 9/1994 | Speer et al. | |
| 5,399,289 A | 3/1995 | Speer et al. | |
| 5,407,984 A | 4/1995 | Brunelle et al. | |
| 5,527,976 A | 6/1996 | Takekoshi et al. | |
| 5,529,833 A | 6/1996 | Speer et al. | |
| 5,591,800 A | 1/1997 | Takekoshi et al. | |
| 5,605,996 A | 2/1997 | Chuu et al. | |
| 5,639,815 A | 6/1997 | Cochran et al. | |
| 5,660,761 A | 8/1997 | Katsumoto et al. | |
| 5,668,186 A | 9/1997 | Brunelle et al. | |
| 5,700,554 A | 12/1997 | Speer et al. | |
| 5,756,644 A | 5/1998 | Hodge et al. | |
| 5,776,361 A | 7/1998 | Katsumoto et al. | |
| 5,955,527 A | 9/1999 | Cochran et al. | |
| 6,083,585 A * | 7/2000 | Cahill et al. | 428/35.7 |
| 6,225,404 B1 | 5/2001 | Sorenson et al. | |
| 6,254,803 B1 | 7/2001 | Matthews et al. | |
| 6,254,804 B1 | 7/2001 | Matthews et al. | |
| 6,255,248 B1 | 7/2001 | Bansleben et al. | |
| 6,323,288 B1 | 11/2001 | Ching et al. | |
| 6,346,308 B1 | 2/2002 | Cahill et al. | |
| 6,365,247 B1 | 4/2002 | Cahill et al. | |
| 6,406,766 B1 | 6/2002 | Rotter et al. | |
| 6,420,047 B2 | 7/2002 | Winckler et al. | |
| 6,420,048 B1 | 7/2002 | Wang | |
| 6,436,548 B1 | 8/2002 | Phelps | |
| 6,436,549 B1 * | 8/2002 | Wang | 428/480 |
| 6,506,463 B1 | 1/2003 | Cahill et al. | |
| 6,509,436 B1 | 1/2003 | Cahill et al. | |
| 6,544,611 B2 | 4/2003 | Schiraldi et al. | |
| 6,558,762 B2 | 5/2003 | Cahill et al. | |
| 6,569,506 B1 | 5/2003 | Jerdee et al. | |
| 6,605,681 B1 | 8/2003 | Villalobos et al. | |
| 6,607,795 B1 | 8/2003 | Yang et al. | |
| 6,610,215 B1 | 8/2003 | Cai et al. | |
| 6,639,009 B2 | 10/2003 | Winckler et al. | |
| 6,713,601 B2 | 3/2004 | Phelps | |
| 6,863,988 B2 | 3/2005 | Tibbitt et al. | |
| 6,946,175 B2 | 9/2005 | Yang et al. | |
| 6,984,694 B2 | 1/2006 | Blasius, Jr. et al. | |

(Continued)

OTHER PUBLICATIONS

Espacenet Abstract for JPS59196323 (A) Nov. 7, 1984.
Patent Abstract of Japan for JPH09003178 Jan. 7, 1997.
Espacenet Abstract for JPH10195285 (A) Jul. 28, 1998.
Espacenet Abstract for JP2000103911 (A) Apr. 11, 2000.
Espacenet Abstract for JP2000119496 (A) Apr. 25, 2000.
Espacenet Abstract for JP2001234042 (A) Aug. 28, 2001.
Espacenet Abstract for JP2001234427 (A) Aug. 31, 2001.
Espacenet Abstract for JP2001234429 (A) Aug. 31, 2001.
Villalobos et al., "Oligomeric chain extenders for economic reprocessing and recycling of condensation plastics" (2006).

(Continued)

*Primary Examiner* — Karuna P Reddy
(74) *Attorney, Agent, or Firm* — John H. Hornickel

(57) ABSTRACT

A method and system for oxygen molecule scavenging is disclosed. The system employs as a novel terpolymer as the reducing agent for oxygen molecules. The terpolymer is the polymerization product of macrocyclic poly(alkylene dicarboxylate) oligomer, unsaturated functional polymer, and epoxy-functional styrene-acrylate oligomer.

19 Claims, No Drawings

(56) References Cited

U.S. PATENT DOCUMENTS

| | | |
|---|---|---|
| 6,994,914 B2 | 2/2006 | Winckler et al. |
| 7,049,359 B2 | 5/2006 | Cochran et al. |
| 7,056,565 B1 | 6/2006 | Cai et al. |
| 7,097,890 B1 | 8/2006 | Ching et al. |
| 7,214,415 B2 | 5/2007 | Tibbitt et al. |
| 7,745,561 B2 | 6/2010 | Bahr et al. |
| 7,879,930 B2 | 2/2011 | Liu |
| 2002/0022099 A1 | 2/2002 | Schmidt et al. |
| 2002/0102424 A1 | 8/2002 | Yang et al. |
| 2005/0048287 A1 | 3/2005 | Ebner et al. |
| 2006/0180790 A1 | 8/2006 | Deshpande et al. |
| 2008/0119619 A1 | 5/2008 | Mullen |
| 2008/0171169 A1 | 7/2008 | Liu |
| 2008/0255280 A1 | 10/2008 | Sims et al. |
| 2009/0028841 A1 | 1/2009 | Gohil |
| 2009/0029078 A1 | 1/2009 | Gohil |
| 2010/0193744 A1* | 8/2010 | Avakian ............ 252/500 |
| 2011/0111951 A1 | 5/2011 | Joslin et al. |
| 2012/0070545 A1* | 3/2012 | Hu et al. ............ 426/106 |

* cited by examiner

OXYGEN SCAVENGING TERPOLYMERS

CLAIM OF PRIORITY

This application claims priority from U.S. Provisional Patent Application Ser. No. 61/218,637 and filed on Jun. 19, 2009, which is incorporated by reference.

FIELD OF THE INVENTION

This invention relates to use of novel terpolymers, functioning as reducing agents, also known as anti-oxidants, to scavenge for oxygen within containers and packaging made from thermoplastic compounds.

BACKGROUND OF THE INVENTION

Spoilage of food has plagued humanity for millennia. Containers for food have evolved from stone to ceramic to metallic to glass to plastic, particularly for single serving consumable foods and beverages.

Shelf life of foods and beverages is affected by oxidation from oxygen molecules within the volume of the container not occupied by the food or beverage ("headspace oxygen"), within the bulk of the container walls ("inherent oxygen"), and permeating through the container walls or closure ("permeated oxygen"). Also the food or beverage itself contains oxygen which equilibrates in the headspace.

Compounds that scavenge for oxygen molecules are known, such as AMOSORB DFC 4020 brand oxygen scavenger from ColorMatrix of Berea, Ohio USA. But that oxygen scavenger product utilizes MXD6 polyamide as its scavenger for oxygen, which can cause issues during recycling for sustainability reasons.

SUMMARY OF THE INVENTION

What the art needs is a non-polyamide system for scavenging for oxygen molecules within thermoplastic compounds, preferably after the compounds are formed into plastic articles and especially for those compounds which are permeable to oxygen.

One aspect of the invention is a terpolymer having carbon-carbon unsaturated bonds susceptible to reaction with oxygen molecules, comprising a polymerization product of macrocyclic poly(alkylene dicarboxylate) oligomer, unsaturated functional polymer, and epoxy-functional styrene-acrylate oligomer.

Another aspect of the invention is a thermoplastic compound, comprising a thermoplastic polymer matrix and a terpolymer functioning as a reducing agent for oxygen molecules.

Another aspect of the invention is a thermoplastic article, comprising the thermoplastic compound, such as a bottle pre-form, a blow-molded bottle, or a bottle containing a perishable food or beverage susceptible to oxidation.

Another aspect of the invention is a method for scavenging for oxygen within a thermoplastic article, comprising the steps of mixing a reducing agent for oxygen molecules into a thermoplastic compound and forming an article from the thermoplastic compound, wherein the reducing agent is a terpolymer described above and wherein the terpolymer has carbon-carbon unsaturated bonds susceptible to reaction with oxygen molecules.

EMBODIMENTS OF THE INVENTION

Thermoplastic Matrix of the Plastic Article

Any thermoplastic can be a candidate forming into a plastic article. While principally the invention serves the perishable food and beverage industry, plastic articles made from the thermoplastic compounds of the present invention can also be used in any industrial or consumer industry which needs to minimize the presence of oxygen because of its corrosive effects. For example, the electronics industry may have a need to limit the presence of oxygen in an enclosed space to minimize oxidation of expensive metals on electronic components within that enclosed space.

Mostly however, the plastic articles are intended to serve as packaging for perishable food or beverage. The ultimate plastic packaging article into which the thermoplastic matrix is formed by molding, extruding, calendering, etc. and what that ultimate article might contain or protect determine the suitability of use of that thermoplastic in the present invention.

Non-limiting examples of thermoplastics used in the food and beverage industries are polyesters (including polylactides and polyhydroxyalkanoates), polyamides, polyolefins, polycarbonates, polystyrenes, polyacrylates, thermoplastic elastomers (including thermoplastic vulcanizates) of all types, and the like.

Because the shelf-life of consumable foods and beverages needs protection from the oxidating effect of reactions with oxygen molecules within or penetrating the containers for such foods and beverages, the selection of the thermoplastic to be used in the present invention is predicated on packaging cost, appearance, and other packaging considerations.

Of the polymeric candidates, polyesters and polyethylene are preferred as packaging materials. Of them, polyesters, particularly polyethylene terephthalate (PET) is used as plastic beverage containers of both carbonated and non-carbonated consumables. Additionally, thermoplastic elastomers are preferred for use as closures or closure liners or gaskets or seals with the packaging materials such as a plastic beverage container.

Reducing Agent for Oxygen Molecules

Once the thermoplastic matrix is selected for the packaging, then the reducing agent for oxygen molecules can be selected. The reducing agent for the present invention is a novel terpolymer formed from oligomers selected for specific reasons as explained below.

Base Component

The base component of the terpolymer is selected to be the same as, or to be compatible with, the thermoplastic matrix which is to be formed into the plastic packaging article.

If the thermoplastic matrix for the plastic article is PET, then the base component can be a macrocyclic poly(alkylene dicarboxylate) oligomer. These polymers, also known as MPO's, are well reported in the literature as having preferred thermoplastic manufacturing characteristics and preferred thermoset use characteristics. One manufacturer, Cyclics Corporation, reports on its CBT® resin products at www.cyclics.com.

CBT™ Resins of cyclic poly(butylene terephthalate) ("PBT") are solid (powder, pellet, flake) at room temperature and when heated are fully molten above 150° C. (300° F.), with a viscosity in the range of 150 mPa·s (150 cP), and drops in viscosity to below 20 mPa·s (20 cP) at 180° C. (355° F.). When mixed with specific tin or titanium polymerization catalysts the PBT rings in cyclical form open and connect (i.e., polymerize) to form high molecular weight PBT thermoplastic without exotherm or off-gassing. Full polymerization can occur in tenth's of seconds or many minutes depending on the temperature and type of catalyst used. The combination of low viscosity and rapid polymerization allows for fast processing in many different applications.

These CBT® Resins exhibit the following properties according to Cyclics Corporation Commercially available PBT grades exhibit a wide range of mechanical, electrical and thermal properties when combined with typical polymer additives and fillers, making PBT thermoplastic a very versatile material. Some of these material advantages include stiffness and toughness, high heat resistance in reinforced grades, chemical resistance, dimensional stability/low water absorption, electrical insulation and high arc resistance, flame retardancy, thermoformability, adaptability to post-mold operations (e.g., welding, gluing, painting), and recycling.

Macrocyclic poly(alkylene dicarboxylate) oligomers are well identified and characterized in U.S. Pat. Nos. 6,436,549; 6,436,548; 6,420,048; 6,420,047; 6,369,157; 5,710,086; 5,668,186; 5,663,282; 5,661,214; 5,648,454; 5,591,800; 5,527,976; 5,498,651; 5,466,744; 5,446,122; 5,434,244; 5,407,984; 5,389,719; 5,387,666; 5,386,037; 5,348,985; 5,231,161; 5,191,013; and 5,039,783 and in U.S. Patent Publication 20020107356; the disclosures of all of which are incorporated herein by reference. Such patents also describe the method of manufacture.

Of the various macrocyclic poly(alkylene dicarboxylate) oligomers disclosed, macrocyclic poly(butylene terephthalate) ("cyclic PBT") and macrocyclic poly(ethylene terephthalate) ("cyclic PET") are desired because of their semicrystalline nature. Cyclic PBT is preferred because of its higher speed of crystallization as compared to cyclic PET.

Of the several cyclic PBT grades, CBT 100 grade is preferred (CAS #263244-54-8) and available from Cyclics Corporation.

Formula I shows cyclic PBT.

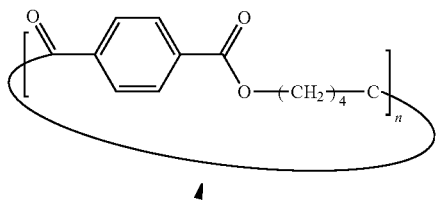

I

Unsaturated Polymeric Reducing Component

The terpolymer next includes the unsaturated polymeric reducing component. Any molecule that is an unsaturated functional polymer, i.e., any monomer or oligomer or functionalized polymer, which retains carbon-carbon unsaturation (including either double or triple bonds) after polymerization of the terpolymer is a candidate for use in the terpolymer.

Non-limiting examples of unsaturated functional polymeric reducing components include hydroxyl- or glycidyl-functional polyalkenes or polyalkynes, such as a hydroxyl-terminated polybutadiene or an epoxy functionalized hydroxyl-terminated polybutadiene. Of these examples, a commercially available hydroxyl-terminated polybutadiene is preferred because it is a colorless liquid amenable to use in reactive extrusion polymerization and has a number average molecular weight of about 2800 with approximately 20% of the backbone being vinyl double bonds (CAS #69102-90-5).

It has also been found, unexpectedly, that the molecular weight of the unsaturated functional polymeric reducing component affects performance of the terpolymer as an oxygen scavenger. Hydroxyl-terminated polybutadiene having a number average molecular weight of about 1300 with approximately 20% of the backbone being vinyl double bonds fails to provide the resulting terpolymer with oxygen scavenging capacity, all other factors being the same. Therefore, the invention prefers a number average molecular weight (Mn) of more than 1400 and preferably at least about 2800.

As of the filing of this patent application, there is no commercial hydroxyl-terminated polybutadiene available with a number average molecular weight between about 1400 and 2800. But hereafter, the scope of this invention shall be deemed to have included such unsaturated functional polymeric reducing components having a Mn greater than about 1400 which react to form a terpolymer which does have oxygen scavenging capacity.

Formula II shows hydroxyl-terminated polybutadiene, wherein n should be greater than 25.

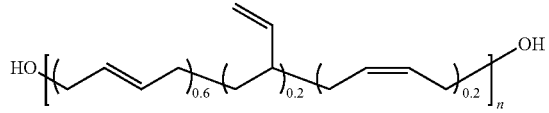

II

Linking Component

To prepare the terpolymer, a linking component is used. Any commercially available chain extender is a candidate for use as the linking component, but it must be compatible with and reactive with both the cyclic PBT and the unsaturated functional polymer.

An excellent candidate for the linking component is an epoxy-functional styrene-acrylate oligomer marketed by BASF Corporation as Joncryl® brand chain extender.

Additional information about the epoxy functional low molecular weight styrene-acrylate copolymer is disclosed in U.S. Pat. No. 6,605,681 (Villalobos et al.) and U.S. Pat. No. 6,984,694 (Blasius et al.), incorporated by reference herein.

Stated another way using those patents for reference, the oligomeric chain extender is the polymerization product of (i) at least one epoxy-functional (meth)acrylic monomer; and (ii) at least one styrenic and/or (meth)acrylic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000. Preferably, the oligomeric chain extender a polydispersity index of from about 1.5 to about 5.

Various Joncryl® grades available and useful from BASF are ADR-4300, ADR-4370-S, ADR-4368-F, and ADR-4368-C, which are all solids. Alternatively, one can use liquid grades, namely: ADR-4380, ADR-4385, and ADR-4318.

Particularly preferred is Joncryl® ADR-4368-C grade. The number average molecular weight of this grade is less than 3000 with approximately more than 4 epoxy functionalities per polymer chain.

The epoxy functionality is suitable for reaction with both the cyclic PBT and the unsaturated functional polymer to form a copolyester terpolymer suitable to function as an excellent reducing agent in scavenging for oxygen within a plastic packaging article containing perishable food or beverage.

Formula III shows the epoxy-functional styrene-acrylate polymer, wherein $R_1$-$R_5$ can be H, $CH_3$, a higher alkyl group having from 2 to 10 carbon atoms, or combinations thereof; and $R_6$ can be an alkyl group; and wherein x, y, and z each can be between 1 and 20.

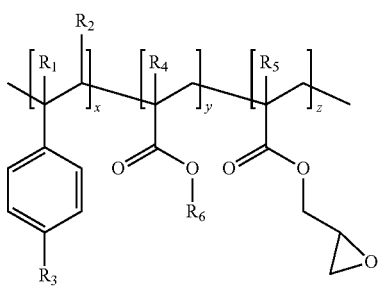

III

Terpolymers synthesized in the present invention are macromolecules capable of reacting with oxygen molecules and scavenge for those oxygen molecules at the surface of the article in which such macromolecules reside and within the bulk of the wall itself. A benefit of use of macromolecular terpolymers is that they are not themselves volatile or mobile within the volume contained by thermoplastic article holding the food or beverage. Macromolecules do not migrate from the thermoplastic compound.

The combination of the base component, the unsaturated functional polymeric reducing component, and the linking component to form the terpolymer makes it suitable for use in this invention because the terpolymer is compatible with the thermoplastic matrix of the plastic article in order to provide good dispersion therein. Alternatively, the terpolymer has good compatibility at a molecular level with the thermoplastic matrix to optimize clarity and translucency. Most preferably, the terpolymer is miscible with the thermoplastic matrix.

The oxygen scavenging properties of the terpolymer arise from the presence of carbon-carbon unsaturated bonds remaining as an unreacted part of the unsaturated functional polymeric reducing component after polymerization of the terpolymer. These carbon-carbon unsaturated bonds are susceptible to reaction with oxygen molecules. Indeed, whereas other uses of such macromolecules as polymers might be seen as decaying in the presence of oxygen, their use as an oxygen scavenging additive to the thermoplastic matrix is beneficial in the present invention.

The terpolymer benefits from catalysis of the three components during polymerization. A commercially available catalyst can be used. Presently preferred is an organic titanate such as titanium tetrakis(2-ethylhexanolate) (CAS #1070-10-6).

The terpolymer can accommodate a wide variety of amounts of the three components, but it has been found that a plurality, and preferably a majority of unsaturated functional polymeric component is preferred because the oxygen scavenging capacity is directly related to the number of unreacted carbon-carbon unsaturated bonds available for reducing oxygen and eliminating it from the interior volume of the plastic packaging article.

The terpolymer is macromolecular and not susceptible to migration or "blooming" from the bulk of the plastic article to a surface of the plastic article but have unsaturated carbon-carbon moieties which are vulnerable to oxidation by free oxygen molecules which come into contact with them, whether within the bulk of the plastic packaging article wall or on the surface of that wall. In effect, this vulnerability becomes the reducing agent of the macromolecular terpolymer and each oxygen molecule—unsaturated carbon bond reaction is a scavenging event for mobile oxygen molecules within a food or beverage container or package made using terpolymers of the present invention Table 1 shows the relative weight percents of acceptable, desirable, and preferred ingredients for the terpolymer.

TABLE 1

| | Terpolymer (Wt. %) | | |
|---|---|---|---|
| Component | Acceptable | Desirable | Preferable |
| Base Component | 30-60% | 35-45% | 40-45% |
| Unsaturated Functional Polymeric Reducing Component (Mn > 1400) | 30-55% | 35-55% | 40-55% |
| Linking Component | 5-20% | 5-20% | 5-10% |
| Catalyst | 0.5-1.5% | 0.75-1.25% | 0.75-1.25% |

Polymerization of the Terpolymer

The polymerization of the terpolymer can occur in batch or continuous operations.

Polymerization in a continuous process typically occurs in an extruder that is elevated to a temperature that is sufficient to melt the base component with addition of the unsaturated functional polymer such as liquid hydroxyl-terminated polybutadiene, the linking component, and the polymerization catalyst at the head of the extruder. Extruder speeds can range from about 20 to about 600 revolutions per minute (rpm), and preferably from about 500 to about 550 rpm, but exact conditions will depend upon extruder diameter, length/distance ratio, etc. For example, a 16 mm ZSK Prism twin screw extruder should operate at about 50-75 rpm, whereas an 18 mm Leistritz twin screw extruder should operate at 500-550 rpm. Typically, the output from the extruder is pelletized for compounding with the thermoplastic matrix of the plastic packaging article.

Mixing in a batch process typically occurs in a Banbury mixer that is also elevated to a temperature that is sufficient to melt the base component to permit excellent mixing and reaction with the other two components. The mixing speeds range from 60 to 1000 rpm. Also, the output from the mixer is chopped into smaller sizes for later compounding as explained above.

Polymerization yields at least about 98% terpolymer, having a weight average molecular weight (Mw) of about 15,000, a number average molecular weight (Mn) of about 8,000, and a polydispersity of from about 1.82 to about 1.95, all measured via Gel Permeation Chromatography (GPC) using polystyrene as a test reference using 5% hexafluoroisopropanol in chloroform as the solvent. The terpolymer was found via Differential Scanning calorimetry (DSC) to have a melting temperature of about 210-215° C.

Masterbatches of the Terpolymer

The terpolymer can function as a masterbatch or concentrate for addition to the thermoplastic matrix and other ingredients at the time of injection molding to form a plastic article. If used as a masterbatch, the terpolymer can serve as a carrier for other ingredients, such as catalysts, colorants, and other functional additives. Formation of masterbatches in which the carrier is an active ingredient to the final plastic article is a technique well known to a person having ordinary skill in the art. Masterbatches of the terpolymer are preferred in order that the terpolymer does not undergo another "heat history" during melt compounding into the thermoplastic matrix.

Compounds of the Terpolymer in the Thermoplastic Matrix

The terpolymer can be mixed into the thermoplastic matrix alone, but the compound preferably benefits from the use of an oxidation catalyst, one that assists the reduction reaction with oxygen.

Indeed, when a catalyst is to be used, it is possible for the catalyst to be pre-mixed into the thermoplastic matrix before compounding with the terpolymer or pre-mixed into a masterbatch carrier before molding with the terpolymer and the thermoplastic matrix.

Oxidation Catalyst for Reducing Component of the Terpolymer

Catalysts can help activate the unsaturated reducing agent component of the terpolymer. Catalysts are not required, but they are preferred. If present, they can be photo-activated catalysts, moisture-activated catalysts, heat-activated catalysts, etc., all well known to a person having ordinary skill in the art.

Terpolymers of the invention can proceed in the scavenging for oxygen without the need for catalysis. For example, packaging which is formed at or near the same time as the filling of that packaging with food or beverage can benefit from such oxygen scavenging agents that do not need activation to begin reducing oxygen molecules.

However, for one particular industry, it is quite important for the terpolymer, functioning as the reducing agent for oxygen molecules, to remain dormant until package or container formation. Beverage bottles and other liquid containers are often made in two steps, one to form a so-called "pre-form" which has the final dimensions of the opening but is collapsed with respect to the final volume; and the second to mold the pre-form into a container, vessel, or bottle of final dimensions. For example, water, soft drink, and beer bottles start as pre-forms with the proper dimensions of the screw cap mouth and a highly collapsed remainder resembling a deflated bottle or a truncated test tube. At the bottling factory, the pre-forms are expanded by blow molding to form liter or half liter bottles just prior to beverage filling.

The relative dormancy of the oxygen scavenging function of the terpolymer is important for the beverage industry because one does not want to waste the oxygen scavenging properties on a pre-form exposed to the environment during storage, prior to blow molding and filling. Therefore, for this industry in particular, and any other which relies on pre-forms, such as the health care or cosmetics industries, the onset of oxygen scavenging needs to be triggered by an event after the formation of the pre-form.

Non-limiting examples of catalysts are transition metals (heat-activated) and benzophenones (photo-activated). The concentration of catalyst relative to terpolymer can be as little as 10 parts per million of terpolymer to contribute to oxygen scavenging.

Of the catalysts, transition metal salts are most preferred because they are thermally activated. Such salts include those of cobalt, cerium, manganese, etc. These types of catalysts are suitable for activation of the terpolymer to function as a macromolecular oxygen reducing agent at the time of formation of the pre-form into a blow-molded bottle, which happens at elevated heat to melt the pre-form for ultimate shaping.

A non-limiting example of a commercially available catalyst is cobalt stearate (CAS #13586-84-0) to serve as a catalyst for the oxidation of the oxidizable organic compounds.

Optional Additives

The plastic article used as food or beverage packaging or oxygen sensitive electronic components can include conventional plastics additives in an amount that is sufficient to obtain a desired processing or performance property for the thermoplastic compound comprising the thermoplastic matrix, the reducing agent for oxygen molecules, and optionally the oxidation catalyst for the reducing agent. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them. If the compound is to be used as a plastic article in any regulated industry, a person having ordinary skill in the art would know to select only those optional additives which are suitable for the regulated end use.

Table 2 shows the relative weight percents of acceptable, desirable, and preferred ingredients for compounds of the present invention which have been combined from masterbatches at the time of injection molding or before as pre-mixed compounds. Either way, Table 2 shows the formulation parameters of the compound in the form of the final plastic article.

TABLE 2

Formulation Parameters

| Weight Percents, except as noted | Acceptable | Desirable | Preferred |
|---|---|---|---|
| Thermoplastic Matrix | 84-99% | 89-97% | 94-99 |
| Reducing Agent for Oxygen Molecules (Terpolymer) | 0.1-3% | 0.1-2% | 0.1-1% |
| Optional Reducing Metal Agent Catalyst | 10-1000 ppm | 10-400 ppm | 10-200 ppm |
| Other Optional Additives | 0-15% | 0-10% | 0-5% |

Usefulness of the Invention

As explained previously, any thermoplastic article which is designed to contain contents which are susceptible to oxidation can benefit from the macromolecular, non-migrating, novel terpolymers functioning as oxygen scavengers which become a part of the article in its final form. The industry benefiting from compounds of the present invention, including its novel terpolymers, can range from highly regulated food and beverage industries to highly regulated high performance electronic industries.

It is known that oxygen can react with flavors, dyestuffs, amino acids, vitamins, fatty acids, anti-oxidants (present for other purposes), and other sensitive organic chemicals. Oxygen can transform enzymes and promote the growth of any aerobic process including the propagation of yeast, mold, or bacteria.

Any food or beverage, medicament or cosmetic, or any other material highly reactive with oxygen molecules can benefit from this invention. Shelf life of food and other perishable materials can be extended because of the presence of the macromolecular reducing agent, preferably activated by a catalyst at an appropriate time.

EXAMPLES

Examples 1 and 2 and Comparative Example A

Preparation of Terpolymer

Examples 1 and 2 and Comparative Example A concern the preparation of the terpolymer from the base component, the unsaturated reducing component, and the linking component.

Table 3 shows the ingredients and the formulations. Table 4 shows the reactive extrusion conditions in a Prism 16 mm 40 L/D twin-screw extruder.

TABLE 3

| Ingredient Name | Example 1 | Example 2 | Comp. Ex. A |
|---|---|---|---|
| Cyclic butylene terephthalate reactive oligomer (CBT ® 100 from Cyclics Corporation of Schenectady, NY) | 39.60% | 44.55% | 44.55% |
| Hydroxyl-terminated functionalized polybutadiene (Mn = 2800) Polybd R-4511 HTLO from Sartomer Company of Exton, PA) | 49.50% | 49.50% | 0.00% |
| Hydroxyl-terminated functionalized polybutadiene (Mn = 1300) Polybd R-20LM from Sartomer) | 0.00% | 0.00% | 49.50% |
| Epoxy-functional styrene-acrylic polymer (Joncryl ® 4368C from BASF Corporation of Florham Park, NJ) | 9.90% | 4.95% | 4.95% |
| Titanium tetrakis(2-ethylhexanolate) (Tyzor ® TOT from DuPont Company of Wilmington, DE) | 0.99% | 0.99% | 0.99% |
| Total | 100.00% | 100.00% | 100.00% |

TABLE 4

Extrusion Conditions
Using 16 mm Prism Twin Screw Extruder
(L/D = 40)

Examples 1 and 2 and Comparative Example A

| Mixture | Ingredients Pre-Mixed in a Blender and then Added at Throat through a Crammer feeder |
|---|---|
| Temperatures (° C.) | |
| Zone 1 | 240 |
| Zone 2 | 240 |
| Zone 3 | 240 |
| Zone 4 | 240 |
| Zone 5 | 240 |
| Zone 6 | 235 |
| Zone 7 | 235 |
| Zone 8 | 235 |
| Zone 9 | 225 |
| Die Temp | 160 |
| RPM | 50 |
| Product Form | Pellets |

Gel permeation chromatography (GPC) was used to analyze Examples 1 and 2 for conversion and molecular weight relative to polystyrene. The test was performed with the following materials: Chloroform with 5% HFIP (Hexafluoroisopropanol) mobile phase recycled back into a 1 gallon bottle; Phenomenex Phenogel 5 µm Linear columns (2 in series). 300×7.8 mm (L×diameter), P/N 00H-3259-KO; 25/75 vol./vol. hexafluoroisopropanol/methylene chloride for dissolving the samples; chloroform for sample dilution; 0.45 µm Teflon™ syringe filters for sample filtration; Autosampler vials with crimp top and rubber seal with Teflon™ barrier; and polystyrene MW standards: 3,500, 30,000, 115,000, 400,000 and 2,000,000.

The samples were prepared as follows: (1) Roughly 20 to 50 mg sample (resin weight) were placed into a 5 mL vial. (2) 1 mL of the 25% HFIP/75% $CH_2Cl_2$ mixture was added. The vial was securely capped. (3) The mixture was stirred, with slight warming, if needed, until the resin was completely dissolved. (4) 3 mL of chloroform was added to the vial. (5) The solution was filtered through the 0.45 µm syringe filter into the Autosampler vial. The top was crimped on the vial.

The GPC Instrument had the following settings: (a) 1 mL/min chloroform with 5% HFIP flow rate through the columns recycled back into the 1 gallon bottle. (b) Pump pressure was 20-30 bar. (c) The sample injection size was 1 µL. (d) The temperature in the column oven was 40° C. The wavelength detected was 254 nm.

The GPC results appear in Table 5, along with melting temperature determined by a TA Instrument DSC 2010 instrument at a heating rate of 10° C./min under a $N_2$ atmosphere.

TABLE 5

Polymerization Evidence of Terpolymer

| | Example 1 | Example 2 | Comp. Ex. A |
|---|---|---|---|
| GPC Analysis | | | |
| Conversion (%) | 98.9 | 98.4 | 97 |
| Mw | 15,000 | 15,000 | 11,000 |
| Mn | 8,000 | 8,000 | 7,000 |
| D | 1.95 | 1.82 | 1.64 |
| DSC Melt Temperature | | | |
| ° C. | 212.7 | 214.7 | 210° C. |

Differential Scanning calorimetry (DSC) was used for evaluating the performance of the terpolymer as an oxygen scavenger. According to ASTM D385-06, the test method consists of heating a sample to an elevated temperature, and once equilibrium is established, changing the surrounding atmosphere from nitrogen to oxygen. For Examples 1 and 2 and Comparative Example A, 120° C. was chosen. The time from the first exposure to oxygen until the onset of oxidation is considered the Oxidation Induction Time (OIT). Specific OIT measurement procedures were as follows:

1) Calibrated the calorimeter instrument for heat flow, gas ($O_2$ & $N_2$) flow rate at 50 cc/min, and thermometer;

2) Weighed 6-8 mg of sample in small pieces (cut if needed)

3) Purged the sample in sample cell with $N_2$ at flow rate of 50 cc/min for 15 min 4) Heated the samples at heating rate of 20° C./min to the setting temperature under $N_2$ atmosphere and record the heat flow 5) Held the temperature at the setting temperature for 10 min in $N_2$ and continued to record the heat flow 6) Switched from $N_2$ to $O_2$ at flow rate of 50 $cm^3$/min 7) Held the samples at the setting point constantly in $O_2$ and continued to record the heat flow for 120 min 8) Collected data of initial oxidation time and peak oxidation time.

Table 6 shows the OIT results for Examples 1 and 2 and Comparative Example A.

TABLE 6

OIT at 120° C.

| Example | Start to oxidation (OIT), min | Peak oxidation time, min |
|---|---|---|
| Ex. 1 | 33.5 | 58.8 |
| Ex. 2 | 36.9 | 61.6 |
| Comp. Ex. A | None | None |

The results of OIT demonstrated both Examples 1 and 2 were good candidates for oxygen scavenging because the OIT results showed good reactivity with oxygen. Comparative Example A failed to give any exothermal peak indicative of oxidation during testing. Another sample of Comparative Example A was made, tested again, and failed again.

Examples 3-4 and Comparative Examples A-B

Examples 3 and 4 were the use of the terpolymers of Examples 1 and 2, respectively, in a polyester thermoplastic matrix which also contained oxygen scavenging catalyst. Comparative Example A was neat polyester. Comparative Example B was a melt-mixture of copolyester thermoplastic matrix with a leading commercial oxygen scavenging agent in the form of a masterbatch.

Table 7 shows the ingredients and the formulations.

TABLE 7

| Ingredient Name (Wt. Percent) | A | Ex. 3 | Ex. 4 | B |
|---|---|---|---|---|
| Copolyester powder (Eastman 9921 P from Eastman Chemical of Kingsport, TN) | 100.0 | 98.8 | 98.8 | 97.0 |
| Example 1 Terpolymer | | 0.6 | | |
| Example 2 Terpolymer | | | 0.6 | |
| Cobalt Stearate Masterbatch (5.3% of Cobalt Stearate (from OMG of Cleveland, Ohio) in 94.7% of Eastman 9921 P copolyester powder) | | 0.6 | 0.6 | |
| Commercial oxygen scavenger of 50-60 wt. % of MXD6 polyamide and about 500 ppm of cobalt catalyst in polyethylene terephthalate | | | | 3.0 |
| Total | 100.0 | 100.0 | 100.0 | 100.0 |

Examples 3 and 4 and Comparative Examples A and B were injection molded into 25 g pre-forms using a BOY50M injection molding machine having a one cavity, water cooled, pre-form mold with an injection temperature of 260° C. at the nozzle and a hopper temperature of 275° C. and an injection cycle time of approximately 25 seconds. The pre-forms were then blow-molded into bottles of 370 ml volume using a POLIOL PA-1 molding machine operating at a temperature of 125° C.

Samples of bottles of each of Examples 3 and 4 and Comparative Examples A and B were then tested for Oxygen Transmission Rate (OTR) using the following test method.

An empty test bottle was first affixed to a metal plate with epoxy in an environment of 22.2° C. and 50% relative humidity. Then the bottle was mounted to Mocon Oxtran machine to determine its oxygen permeation rate. Once the bottle's oxygen permeation rate had reached equilibrium for a given test interval, the bottle was removed from Mocon Oxtran, and placed under a continuous purge of the 99.9% nitrogen/0.1% hydrogen internally by moving the bottle to a purging system. The bottle's oxygen permeation rate was measured monthly for up to 4 months, by removing the bottle from the purging station and placing them onto a measurement cell until fully equilibrated. Table 9 shows the results.

TABLE 9

| | OTR After Duration In Months Shown (($cm^3$/(pkg-day)) | | | | | |
|---|---|---|---|---|---|---|
| Example | Fresh | 1 | 2 | 3 | 4 | 5 |
| A | 0.0587 | 0.055* | 0.052* | 0.049* | 0.0446 | 0.0411 |
| 3 | 0.0132 | 0.01 | 0.0057 | 0.0067 | 0.0069 | |
| 3 | 0.0206 | 0.0134 | 0.0054 | 0.0012 | 0.0031 | |
| 4 | 0.0385 | 0.0376 | 0.0342 | 0.0323 | 0.0321 | |
| 4 | 0.0304 | 0.0285 | 0.0262 | 0.0242 | 0.0225 | |
| B | 0.014 | 0.015 | 0.0200 | 0.0207 | 0.0199 | |

*Extrapolation between data for Fresh, Month 4, and Month 5

The performance of Examples 3 and 4 compare favorably to Comparative Example B even though the latter has 5 times the amount of oxygen scavenger additive in the bottle made from the compound (3% vs. 0.6%). Indeed, Example 3 performs much better than the oxygen scavenger of Comparative Example B, over the four months, even with 5 times less reducing agent present.

Examples 5-9 and Comparative Examples C-E

Additional tests were performed in compounds using the terpolymer formulation of Example 2 in a commercial equipment environment, under confidentiality, with indeterminate polyester and catalyst and colorant masterbatches. However, to simulate commercial conditions for the terpolymer, Example 2 was made on a larger reactive extruder with extrusion conditions identified in Table 10. Table 11 shows the ingredients, molding method and results.

TABLE 10

Extrusion Conditions
Using 18 mm Leistritz twin screw extruder (L/D = 60))

| | All Examples 5-9 |
|---|---|
| Mixture | CBT 100 resin and Joncryl ® 4368C oligomer were manually pre-mixed, and then metered into the main feed port in Barrel #1 using a K-Tron BSP-100 gravimetric feeder. A solution of PBD |

TABLE 10-continued

Extrusion Conditions
Using 18 mm Leistritz twin screw extruder (L/D = 60))

All Examples 5-9 and catalyst Tyzor ® TOT is pumped into Barrel #5 at elevated temperatures (up to 50 C) using a Zenith gear pump based system.

| | |
|---|---|
| Brl 1 - Feed (water cool Y/N) | Y |
| Brl 2 - Zone 1 (° C.) | 80 |
| Brl 3 - Zone 2 (° C.) | 120 |
| Brl 4 - Zone 3 (° C.) | 200 |
| Brl 5 - Zone 4 (° C.) | 240 |
| Brl 6 - Zone 5 (° C.) | 240 |
| Brl 7 - Zone 6 (° C.) | 240 |
| Brl 8 - Zone 7 (° C.) | 240 |
| Brl 9 - Zone 8 (° C.) | 240 |
| Brl 10 - Zone 9 (° C.) | 235 |
| Brl 11 - Zone 10 (° C.) | 210 |
| Brl 12 - Zone 11 (° C.) | 180 |
| Die - Zone 12 (° C.) | 160 |
| Screw Speed (RPM) | 550 |
| Liquid Injection Location | Brl 5 |
| Vacuum (bar) Location | Plug |
| Barrel Pyro 1 Brl 4 (Read) | 178 |
| Barrel Pyro 2 Brl 6 (Read( | 248 |
| Melt Temp (° C.) (Read) | 149 |
| Die Pressure (Read) | 369 |
| % Torque (Read) | 43 |
| Feeder 1 Rate (lbs./h) (Read) | 7.5 |
| RPM Liquid Feed (Read) | 54 |
| Liquid Injection Rate (lbs/h) (Read) | 7.5 |
| Throughput Rate (lbs/h) | 15 |
| Product Form | Pellets |

Molding method A used a commercial molding operation which molds pre-forms to be blow-molded into one liter plastic bottles. The molding machine had 72 cavities to produce 72 pre-forms of 35 g mass with a cycle time of about 11 seconds at 300° C. temperature. Samples of bottles of each of Examples 5 and 6 and Comparative Example C using Method A were then tested for Oxygen Transmission Rate (OTR) using the same testing method as Examples 3 and 4 were tested, but the test was performed under atmospheric condition, but not under 22.2° C. and 50% relative humidity. Table 12 shows the results. From Table 12, it is shown that both of Examples 5 and 6 exhibited much higher oxygen scavenging performances than the Comparative Example C (i.e. the PET bottles which do not contain the Example 2 Terpolymer). Also it is noted that Example 6 showed much lower OTR than Example 5, which indicated that the colorant used would improve the oxygen scavenging activity of Example 2 Terpolymer.

Molding method B used a commercial molding operation which also molds pre-forms to be blow-molded into one-half liter plastic bottles. The molding machine had 48 cavities to produce 48 pre-forms of 24 g mass with a cycle time of about 10 seconds at 305° C. temperature. Samples of bottles of each of Examples 7 and 9 and Comparative Example D using Method B were then tested for oxygen ingress using the following test method with the OxySense® 210 T system. The results are shown in Tables 13 and 14, and the testing procedure is as follows:

1. Gather bottles of each variable to be tested
2. In small aluminum weight dish, squeeze a small amount of the silicone glue out
3. Remove O2xyDot® (O2xyDot® contains a special dye impregnated "sensor dot" that changes fluorescence as a function of oxygen concentration) from the packaging with the vacuum pen, shiny (glass substrate) side up. Dip the cut off Q-Tip in the glue and apply the glue to the shiny side of the dot.
4. Place one dot inside the bottle in a spot with a flat surface that will be below the fill line and an additional dot above the expected fill line. Try to place the dot in the same position for all bottles in the set.
5. Allow 15-30 minutes for glue to completely dry.
6. Make the metal closure by pulling a ½" rubber septum as far through a fender washer as possible and cut off the excess septum
7. Fill bottles to their fill line with sterile, distilled water.
8. Apply a small ring of epoxy to the finish of the bottle and press down onto washer
9. Apply another ring of epoxy around the finish and septum to ensure a good seal with no leaks
10. Allow 15-30 minutes for the quick setting epoxy to cure
11. Place two 18 G needles into the each septum: one connected to a syringe filled with water and a second connected to a tank of 99.99% nitrogen. For the nitrogen purge needle, place an extension onto the needle so that the gas bubbles below the water fill line
12. Purge bottle at a rate of 65-70 cc/min at least 3-4 hours to reduce oxygen concentration below 0.5%. After 3 hours, check the oxygen level in the bottle with the OxySense® 210T analyzer to determine if more purge time is required
13. Remove bottles from purge station and take initial readings from O$_2$xyDot® located both in the bottle headspace and below the fill line.
14. Place samples in the 72° F./50% RH for storage during the duration of the test
15. Remove bottles at designated intervals and read oxygen concentration with the OxySense® system.
16. Determine the oxygen ingress by subtracting the initial oxygen concentration from the current oxygen concentration reading.

Table 13 shows the oxygen ingress in water content for each water-filled bottle, and Table 14 shows the oxygen ingress in headspace for each water-filled bottle. In both Tables 13 and 14, any negative value for oxygen ingress in either water content or headspace means no oxygen ingress in water content or headspace but also that the oxygen trapped in the either water content or headspace during filling was consumed by the oxygen scavenger additive in the sidewall of the bottle.

As Tables 13 and 14 illustrate, a bottle of Examples 7 to 9 with the addition of the terpolymer of Example 2 at loading from 0.45 to 1.2 wt % showed much less oxygen ingress in either water content or headspace than Comparative Example D. However, Examples 7 and 8 are less effective than Comparative Example E, a MXD6 polyamide technology, but benefit from the commercial reality that recycling of a copolyester-based oxygen scavenger is easier than recycling of a polyamide-based oxygen scavenger because of thermo-oxidative discoloration of the latter which deters sustainability.

Moreover, Example 9 bottles, which include 1.2 wt % loading of Example 2 terpolymer, was comparable to Comparative Example E and still benefited from preferred recycling sustainability. From this comparison, one having ordinary skill in the art and the knowledge of the results of Table 9 would recognize that the performance of Example 3 (made from Example 1 terpolymer and superior to the performance of Example 4) would yield, in this experiment, a superior oxygen ingress performance than Comparative Example E and also the preferred recycling sustainability.

TABLE 11

| Ingredient (wt %) | C | 5 | 6 | D | 7 | 8 | 9 | E |
|---|---|---|---|---|---|---|---|---|
| PET | 100 | 97.60 | 97.35 | 100 | 99.1 | 98.8 | 97.6 | |
| PET with 40.6 ppm of cobalt catalyst | | | | | | | | 98 |
| Example 2 Terpolymer made as per Table 10 | | 1.20 | 1.20 | | 0.45 | 0.6 | 1.2 | |
| Cobalt Masterbatch (5000 ppm cobalt) | | 1.20 | 1.20 | | 0.45 | 0.6 | 1.2 | |
| Colorant Masterbatch | | | 0.25 | | | | | |
| Commercial oxygen scavenger believed to contain about 50-60% of MXD6 polyamide and about 508 ppm of cobalt catalyst in polyethylene terephthalate | | | | | | | | 2.0 |
| Total | 100 | 100 | 100 | 100 | 100 | 100 | 100 | 100 |
| Molding Method | A | A | A | B | B | B | B | B |

TABLE 12

| | OTR in testing days (cc/(pkg-day)) for 3-5 days |
|---|---|
| Comp. Ex. C | 0.08150 |
| Comp. Ex. C | 0.07500 |
| Example 5 | 0.00210 |
| Example 6 | 0.00054 |

TABLE 13

| | $O_2$ Ingress in Water for Water-filled Bottle (ppb) | | | |
|---|---|---|---|---|
| Days | 0 | 7 | 13 | 27 |
| Comp. Ex. D | 0 | 149.74 | 302.44 | 561.22 |
| Comp. Ex. D | 0 | 165.07 | 363.8 | 592.7 |
| Example 7 | 0 | 124.47 | 195.8 | 212.5 |
| Example 7 | 0 | 197.95 | 300.3 | 370.6 |
| Example 8 | 0 | 100.06 | 90.8 | −73.4 |
| Example 8 | 0 | 109.15 | 153.9 | 55.1 |
| Example 9 | 0 | −16.69 | −48.1 | −53 |
| Example 9 | 0 | −131.92 | −220.1 | −333.2 |
| Comp. Ex. E | 0 | −126.15 | −175.7 | −192.3 |
| Comp. Ex. E | 0 | −111.16 | −156.1 | −197.5 |

TABLE 14

| | $O_2$ Ingress in Headspace for Water-Filled Bottle (%) | | | |
|---|---|---|---|---|
| Day No. | 0 | 7 | 13 | 27 |
| Comp. Ex. D | 0 | 0.47 | 0.83 | 1.48 |
| Comp. Ex. D | 0 | 0.58 | 0.91 | 1.59 |
| Example 7 | 0 | 0.25 | 0.48 | 0.65 |
| Example 7 | 0 | 0.34 | 0.69 | 1.03 |
| Example 8 | 0 | 0.21 | 0.36 | 0.14 |
| Example 8 | 0 | 0.27 | 0.44 | 0.27 |
| Example 9 | 0 | −0.07 | −0.1 | −0.16 |
| Example 9 | 0 | −0.37 | −0.59 | −0.96 |
| Comp. Ex. E | 0 | −0.33 | −0.43 | −0.59 |
| Comp. Ex. E | 0 | −0.22 | −0.34 | −0.54 |

Therefore, without undue experimentation, one skilled in the art can compound increasing amounts of terpolymer to achieve multiples of amounts of oxygen scavenging capacity to determine the rate of scavenging by the terpolymer functioning as the reducing agent for oxygen molecules present or permeating over a number of months of shelf life for the plastic packaging article containing the perishable and consumable food or beverage.

The invention is not limited to the above embodiments. The claims follow.

What is claimed is:

1. A terpolymer having carbon-carbon unsaturated bonds susceptible to reaction with oxygen molecules, comprising:
a polymerization product of macrocyclic poly(alkylene dicarboxylate) oligomer, unsaturated functional polymer, and epoxy-functional styrene-acrylate oligomer wherein the unsaturated functional polymer is hydroxyl-terminated polybutadiene having a number average molecular weight greater than 1400.

2. The terpolymer of claim 1, wherein the macrocyclic poly(alkylene dicarboxylate) oligomer comprises macrocyclic poly(butylene terephthalate) or macrocyclic poly(ethylene terephthalate) or a combination of them both.

3. The terpolymer of claim 1, wherein the epoxy-functional styrene-acrylate oligomer is the polymerization product of (i) at least one epoxy-functional acrylic monomer; and (ii) at least one styrenic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000.

4. The terpolymer of claim 1, wherein the macrocyclic poly(alkylene dicarboxylate) oligomer is present in the terpolymer in a weight percent ranging from about 30 to about 60 of the terpolymer, wherein the unsaturated functional polymer is present in the terpolymer in a weight percent ranging from about 30 to about 55 of the terpolymer, and wherein the epoxy-functional styrene-acrylate oligomer is present in the terpolymer in a weight percent ranging from about 5 to about 20 of the terpolymer.

5. The terpolymer of claim 1, wherein the macrocyclic poly(alkylene dicarboxylate) oligomer is present in the terpolymer in a weight percent ranging from about 35 to about 45 of the terpolymer, wherein the unsaturated functional polymer is present in the terpolymer in a weight percent ranging from about 35 to about 55 of the terpolymer, and wherein the epoxy-functional styrene-acrylate oligomer is present in the terpolymer in a weight percent ranging from about 5 to about 20 of the terpolymer.

6. The terpolymer of claim 1, wherein the macrocyclic poly(alkylene dicarboxylate) oligomer is present in the terpolymer in a weight percent ranging from about 40% to about 45% of the terpolymer, wherein the unsaturated functional polymer is present in the terpolymer in a weight percent ranging from about 40% to about 55% of the terpolymer, and wherein the epoxy-functional styrene-acrylate oligomer is present in the terpolymer in a weight percent ranging from about 5% to about 10% of the terpolymer.

7. The terpolymer of claim 6, wherein the terpolymer has a weight average molecular weight (Mw) of about 15,000, a number average molecular weight (Mn) of about 8,000, and a polydispersity of from about 1.82 to about 1.95, all as measured via Gel Permeation Chromatography (GPC) using polystyrene as a test reference.

8. The terpolymer of claim 7, wherein the terpolymer has a melting temperature of about 210-215° C. measured by Differential Scanning Calorimetry (DSC).

9. A thermoplastic compound, comprising: (a) a thermoplastic polymer matrix; and (b) a terpolymer of claim 1.

10. The thermoplastic compound of claim 9, further comprising a catalyst for the terpolymer functioning as a reducing agent for oxygen molecules.

11. The thermoplastic compound of claim 9, further comprising a functional additive selected from the group consisting of adhesion promoters; biocides, anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

12. The thermoplastic compound of claim 9, wherein the terpolymer comprises from about 0.1 to about 3 percent by weight of the compound.

13. A thermoplastic article, comprising the thermoplastic compound of any of claims 9-12.

14. The thermoplastic article of claim 13, wherein the article is a bottle pre-form.

15. The thermoplastic article of claim 13, wherein the article is a blow-molded bottle.

16. The article of claim 15, wherein the bottle contains a perishable food or beverage susceptible to oxidation.

17. A method for scavenging for oxygen within a thermoplastic article, comprising:
   (a) mixing a reducing agent for oxygen molecules into a thermoplastic compound and
   (b) forming an article from the thermoplastic compound containing the reducing agent,
   wherein the reducing agent is a terpolymer of claim 1, and wherein the terpolymer has carbon-carbon unsaturated bonds susceptible to reaction with oxygen molecules.

18. The method of claim 17, wherein step (a) also includes mixing a catalyst into the thermoplastic compound.

19. The method of claim 17, wherein the terpolymer reduces an oxygen molecule by reaction with a carbon-carbon unsaturated bond, thereby scavenging the oxygen molecule from the article.

* * * * *